July 6, 1948.  C. F. COMSTOCK  2,444,693
AIRCRAFT LOAD CALCULATOR
Filed Feb. 16, 1943  2 Sheets-Sheet 1
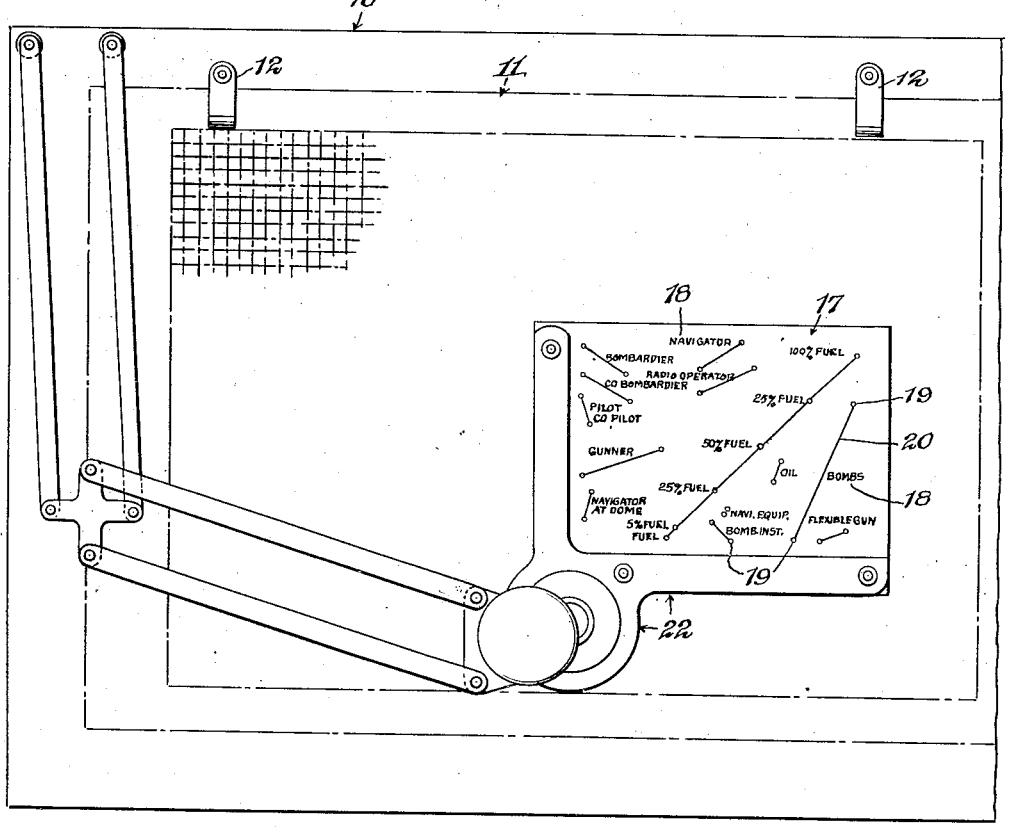
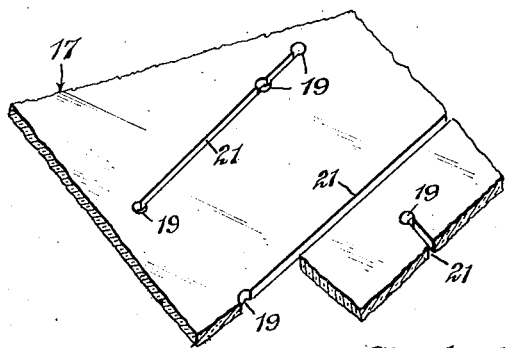
INVENTOR
Charles F. Comstock
BY
ATTORNEYS July 6, 1948.  C. F. COMSTOCK  2,444,693
AIRCRAFT LOAD CALCULATOR
Filed Feb. 16, 1943  2 Sheets-Sheet 2
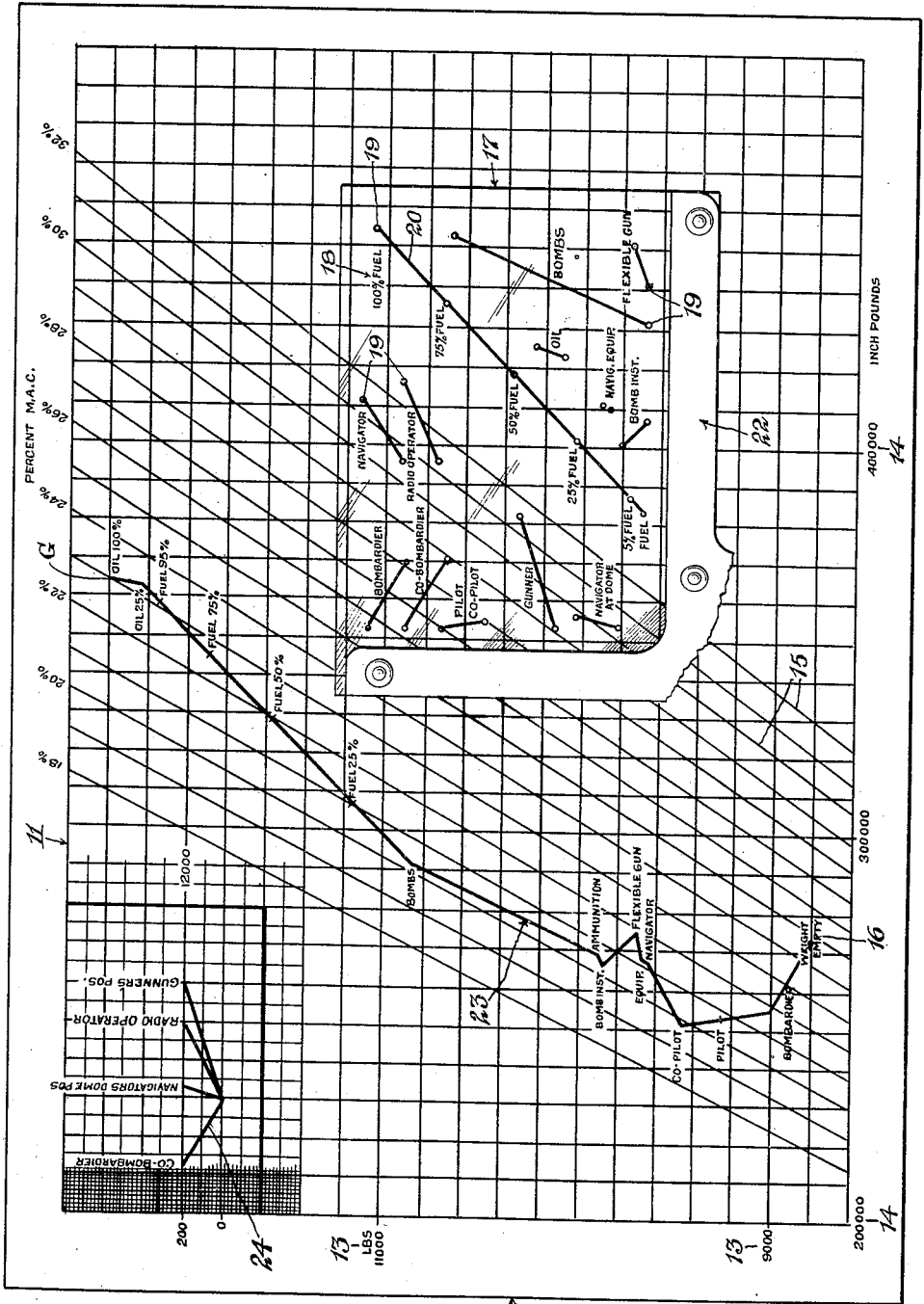
INVENTOR
Charles F. Comstock
BY
ATTORNEYS Patented July 6, 1948

2,444,693

UNITED STATES PATENT OFFICE 2,444,693

AIRCRAFT LOAD CALCULATOR

Charles F. Comstock, Hagerstown, Md.

Application February 16, 1943, Serial No. 476,039

3 Claims. (Cl. 346—146)

This invention relates to a calculator which is designed and adapted to be used advantageously for determining the effect of the load on the weight and center of gravity of an aircraft or the like.

Experience has taught that in order to prevent undesirable take-off, flight and landing characteristics of modern airplanes, it is necessary to keep very close control of the loading, so that the change in position of the gross center of gravity does not exceed fixed limits. Due to the large number of disposable load items which are carried by a craft, the calculation of the center of gravity becomes a complicated procedure.

The device of the present invention is therefore useful to determine in a simple manner the effect of any load item on the gross weight and center of gravity, and to indicate at once when the loading is within allowable limits.

Some of the objects, advantages and benefits of the invention are as follows. It provides an accurate, rapid and simple means for determining the effect of every conceivable type of load for a given airplane on the weight and center of gravity.

It is simple to operate and the principles of use can be taught in a few minutes.

It may be readily constructed for any type airplane with very simple preliminary calculations.

It may be modified readily to take care of changes in the position of any useful load or of the weight empty of the airplane itself.

It may be constructed of non-strategic materials.

For use with an entirely different airplane it is only necessary to provide a new chart and indicator; all other parts of the instrument are entirely interchangeable.

Any special useful load item not shown on the chart may be allowed for very readily without excessive calculation.

A recheck of the entire flight load may be accomplished within a few seconds.

Duplicate copies may also be made for record purposes if desired.

The nature of the invention and its distinguishing features will appear when the following specification is read in conjunction with the accompanying drawing, in which:

Figure 1 shows an assemblage of components constituting one embodiment of the invention.

Figure 2 shows the indicator adjusted with respect to the graph of the calculator.

Figure 3 is a fragmentary face view of a modification of the indicator.

Referring now more particularly to the drawing it will be apparent there is shown a board 10 of suitable size. A plotted sheet 11 is fastened to the board 10 by fasteners or clips 12. If desired a plurality of sheets 11 may be fastened to the board. Each sheet is conventional in that it contains vertical and horizontal lines to constitute a vertical scale and a horizontal scale with required markings and indices to form a graph or chart. The indices 13 of the vertical scale are gross weight for a given airplane, whereas the indices 14 denote moments in inch-pounds about a reference axis for the various positions of the center of gravity in percent of mean aerodynamic chords. These chords designated by the letters M. A. C. are represented by straight lines 15 which are determined for any given airplane by a simple mathematical calculation. It is to be understood the lines 15 change according to the type of craft being serviced and its specifications of useful and special load together with the weight empty of the craft. The weight empty indicia on the chart is designated 16.

Use is made of an indicator 17 in the form of a template and consisting of a rectangular piece of transparent sheet material. On this indicator are labeled the various items 18 of useful or special load, such as navigator bombardier, co-bombardier, radio operator, pilot, co-pilot, navigator at dome, 100% fuel, 25% fuel, 50% fuel, 5% fuel, oil, bombs, navigating equipment, bomb instruments, flexible gun, and any other necessary load items. Markings on the indicator consist of two or more holes 19 connected by a line 20, shown in Figures 1 and 2 or a slot 21, shown in Figure 3. The vertical distance between the end points or holes represents the weight of the items indicated. The horizontal distance between the end points or holes represents the difference in moments about the reference line caused by the addition of the item.

In the present instance the indicator 17 is attached to a device 22 which is operable to shift or adjust the indicator on the chart in such manner that it will always be in parallelism therewith, for the purpose of marking the chart to indicate the computations.

The method of operation is as follows: Referring to Figures 1 and 2, the chart 11 is clamped to the board 10 by means of the fasteners or clips 12, or by any other convenient means in a properly aligned position. The weight empty of the given type airplane is marked on the chart. The effect of adding any item of useful or special load is then found by setting the initial point of the particular item as marked on the indicator at the weight empty, then marking the end point for the particular item or items desired on the chart. Items may be added in sequence by continuing this process, setting the initial point of the item which is being added at the point marked on the chart and noting the end point.

For example: a load condition is shown at 23, on the chart. To the weight empty the bombardier has been added, the pilot, then the co-pilot, the navigator, navigator equipment, flexible gun, bomb installation, ammunition, bombs and fuel and oil. The addition of all of these items results in an end point at "G" which indicates a gross weight of 12,400 pounds and a center of gravity of 23%. If it is desired to determine what the center of gravity would be during the flight after bombs had been dropped, ammunition used up, fuel used and part of the oil gone it would only be necessary to reverse the procedure, setting the items on the indicator devices at the gross point and taking off the items in the order desired.

The center of gravity at any stage of the calculation and the gross weight at a glance is visually indicated, and loads can be readily plotted as desired to maintain the gross weight and center of gravity within the required limit. These calculations can be made during the flight without difficulty to keep a running check of the variations on the center of gravity and weight.

In lieu of the indicator a small diagram 24 shown in Figure 2 may be used. The vectors may be transferred to any part of the chart by paralleling.

I claim:

1. A calculator for determining load effect with respect to the weight and center of gravity of a craft, comprising a plotting board for receiving a chart having a gross weight scale, a moment scale in inch-pounds, and percentage lines denoting mean aerodynamic chords, and a transparent template having linear markings corresponding in length and inclination to the weight and location of load items affecting the weight and center of gravity of said aircraft, said template further having holes therethrough corresponding to said markings and adjacent thereto for marking the chart in accordance with the length and inclination of said linear markings, said template being cooperable with said chart and adjustable relatively to said board while maintaining the relative position of said linear markings with respect to the board for the purpose of marking said chart to indicate the gross weight and the location of the center of gravity of said craft in any loaded and partially loaded condition.

2. A calculator for determining load effect with respect to the weight and center of gravity of a craft, comprising a plotting board for receiving a graph for a given craft on which gross weight is plotted on a vertical scale, and the moment in inch-pounds about a reference axis is plotted along a horizontal scale, for various positions of the center of gravity in per cent of mean aerodynamic chords, said chords on said sheet being represented by straight lines, and an indicator of transparent sheet material provided with linear markings corresponding in length and inclination to the weight of load items and the location of said load items with respect to the center of gravity of said aircraft, said indicator further having holes therethrough corresponding to said markings and adjacent thereto for marking the chart in accordance with the length and inclination of said linear markings, said indicator being cooperative with said graph and adjustable relatively to said board while maintaining the relative position of the markings with respect to the graph for the purpose of marking said graph to indicate the gross weight and the location of the center of gravity of said craft in any of its loaded and partially loaded conditions.

3. A calculator for determining load effect with respect to the weight and center of gravity of an aircraft, comprising a plotting board for receiving a sheet containing a graph consisting of a vertical gross weight scale, a horizontal scale denoting difference in moments in inch-pounds and a scale denoting percentages in mean aerodynamic chords, and a transparent indicator template having a plurality of linear marks thereon, each terminating in holes in said template for receiving a marking device to mark said chart, each linear mark corresponding in length and inclination to the weight and location of a load item for said aircraft affecting the center of gravity and weight of said aircraft, said template being cooperative with said graph and adjustable over the plotting board while maintaining the relative position of the marks with respect to the graph for marking the same to indicate the weight and the location of the center of gravity of the aircraft in any of its loaded and partially loaded conditions.

CHARLES F. COMSTOCK.

REFERENCES CITED

The following references are of record in the file of this patent:

UNITED STATES PATENTS

| Number | Name | Date |
| --- | --- | --- |
| 1,337,168 | Uttmark | Apr. 13, 1920 |
| 1,402,803 | Smith | Jan. 10, 1922 |
| 1,413,973 | Darville | Apr. 25, 1922 |
| 1,536,574 | Dumond | May 5, 1925 |
| 1,984,390 | Wright | Dec. 18, 1934 |
| 1,989,223 | Barr | Jan. 29, 1935 |
| 2,033,715 | Jacob | Mar. 10, 1936 |
| 2,179,822 | Imm | Nov. 14, 1939 |
| 2,230,954 | Jakosky | Feb. 4, 1941 |

FOREIGN PATENTS

| Number | Country | Date |
| --- | --- | --- |
| 937 | Great Britain | Sept. 28, 1901 |
| 410,271 | Germany | Mar. 3, 1925 |